Sept. 28, 1926.
W. J. MILLER
1,601,699
MACHINE FOR MANUFACTURING MARBLES AND SIMILAR ARTICLES
Filed Dec. 12, 1924      5 Sheets-Sheet 2
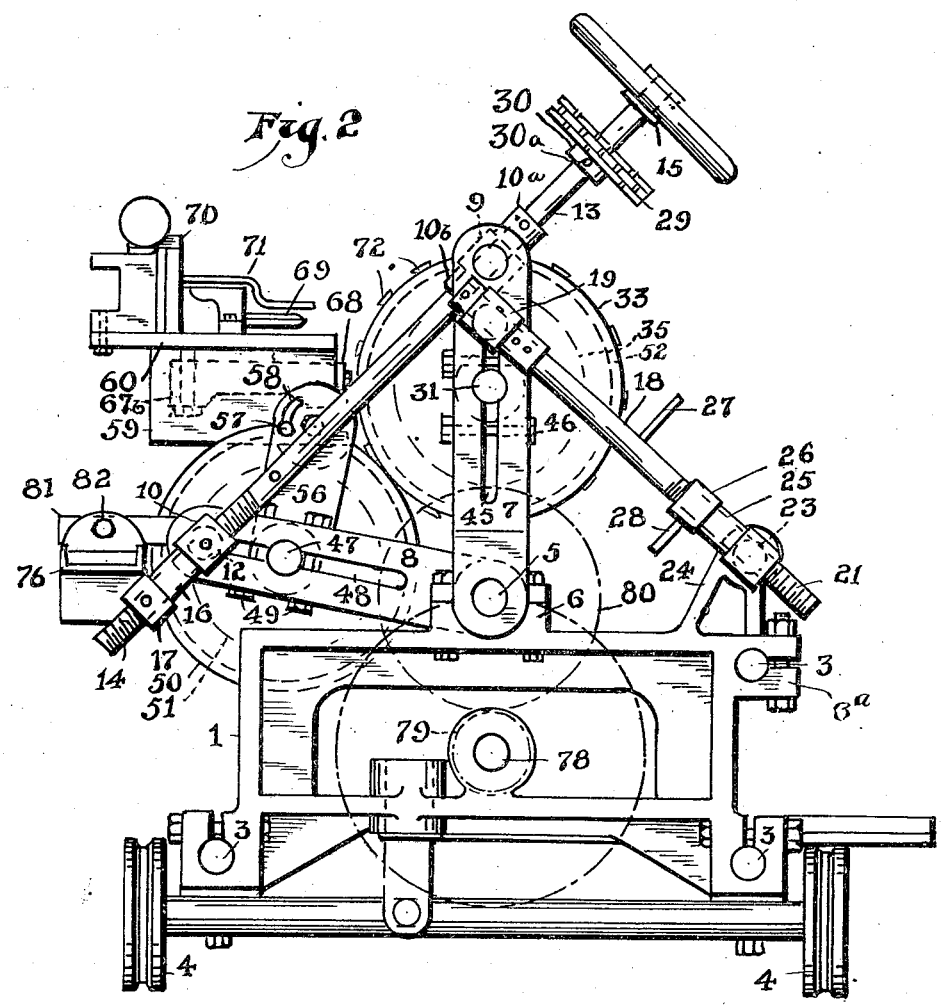
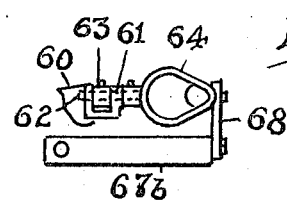

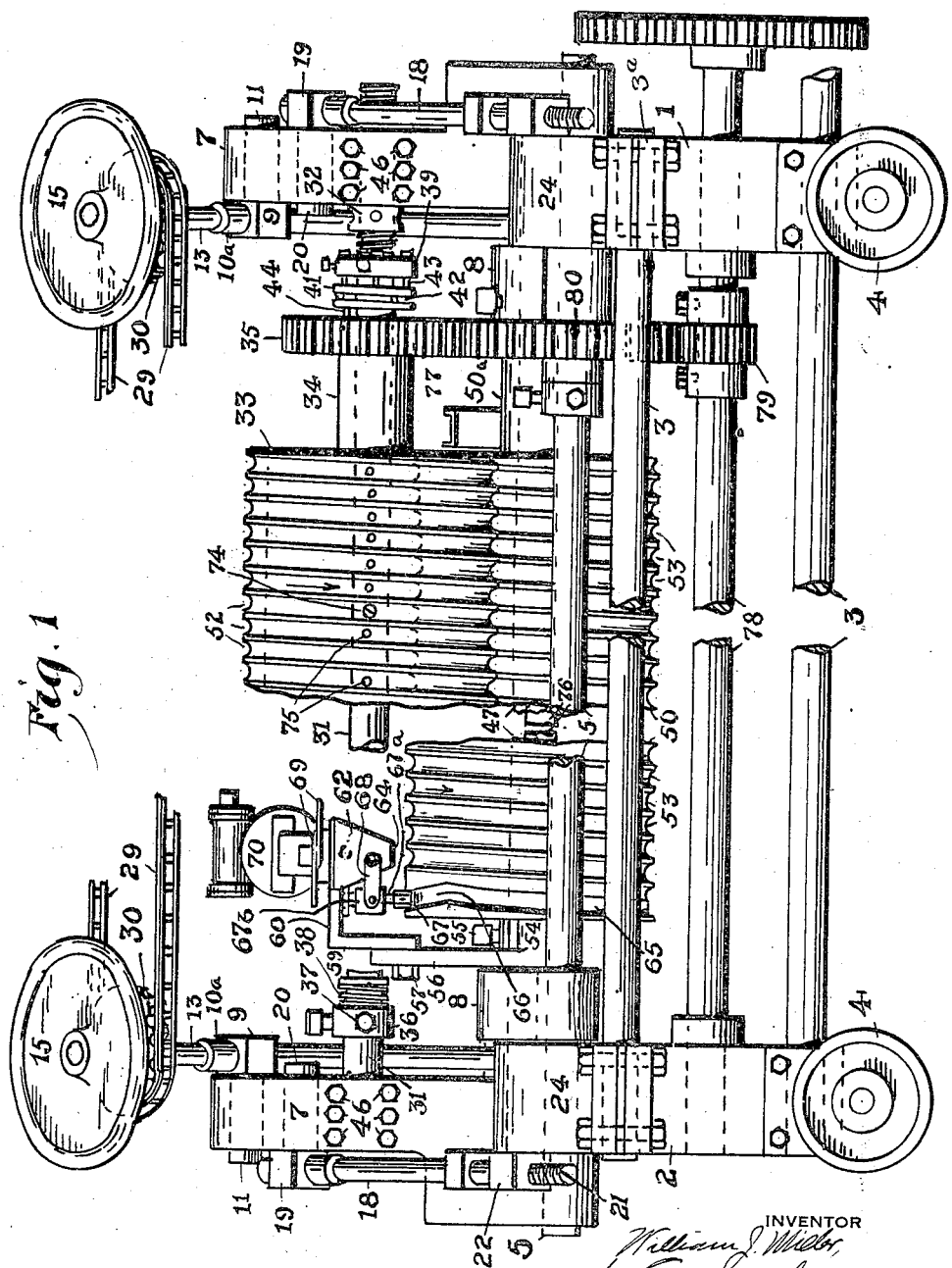

Sept. 28, 1926.　　　　　　　　　　　　　　　　　　1,601,699
W. J. MILLER
MACHINE FOR MANUFACTURING MARBLES AND SIMILAR ARTICLES
Filed Dec. 12, 1924　　　5 Sheets-Sheet 3
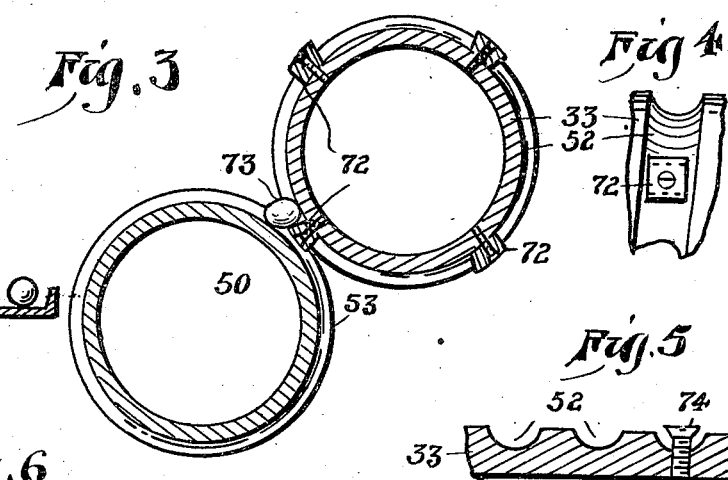
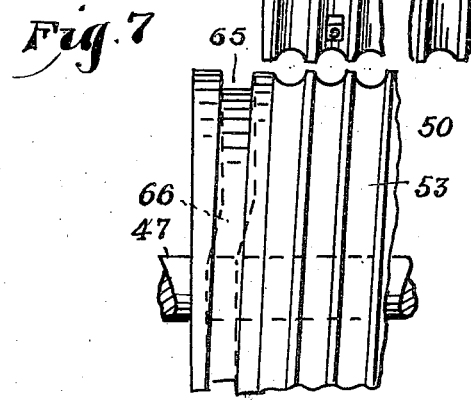
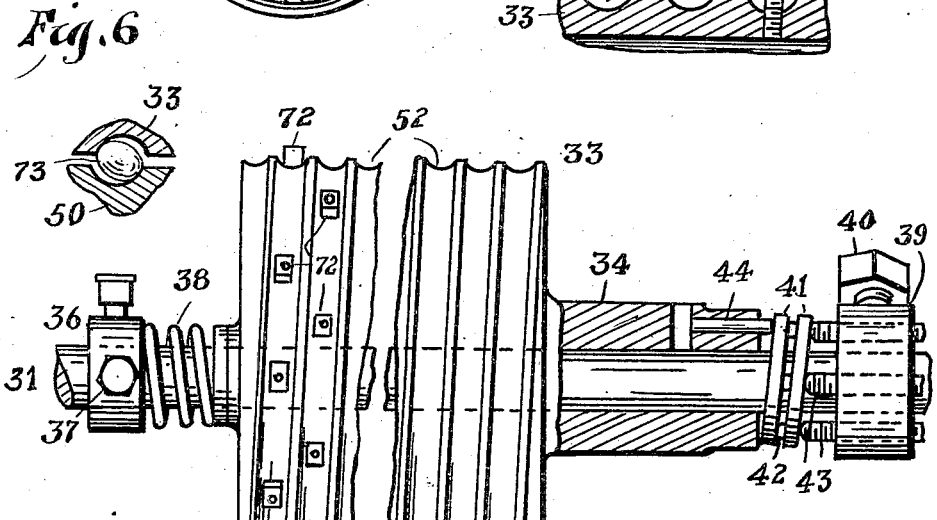
INVENTOR
William J. Miller,
by Edward A. Lawrence
his attorney.

Sept. 28, 1926.  W. J. MILLER  1,601,699
MACHINE FOR MANUFACTURING MARBLES AND SIMILAR ARTICLES
Filed Dec. 12, 1924   5 Sheets-Sheet 4
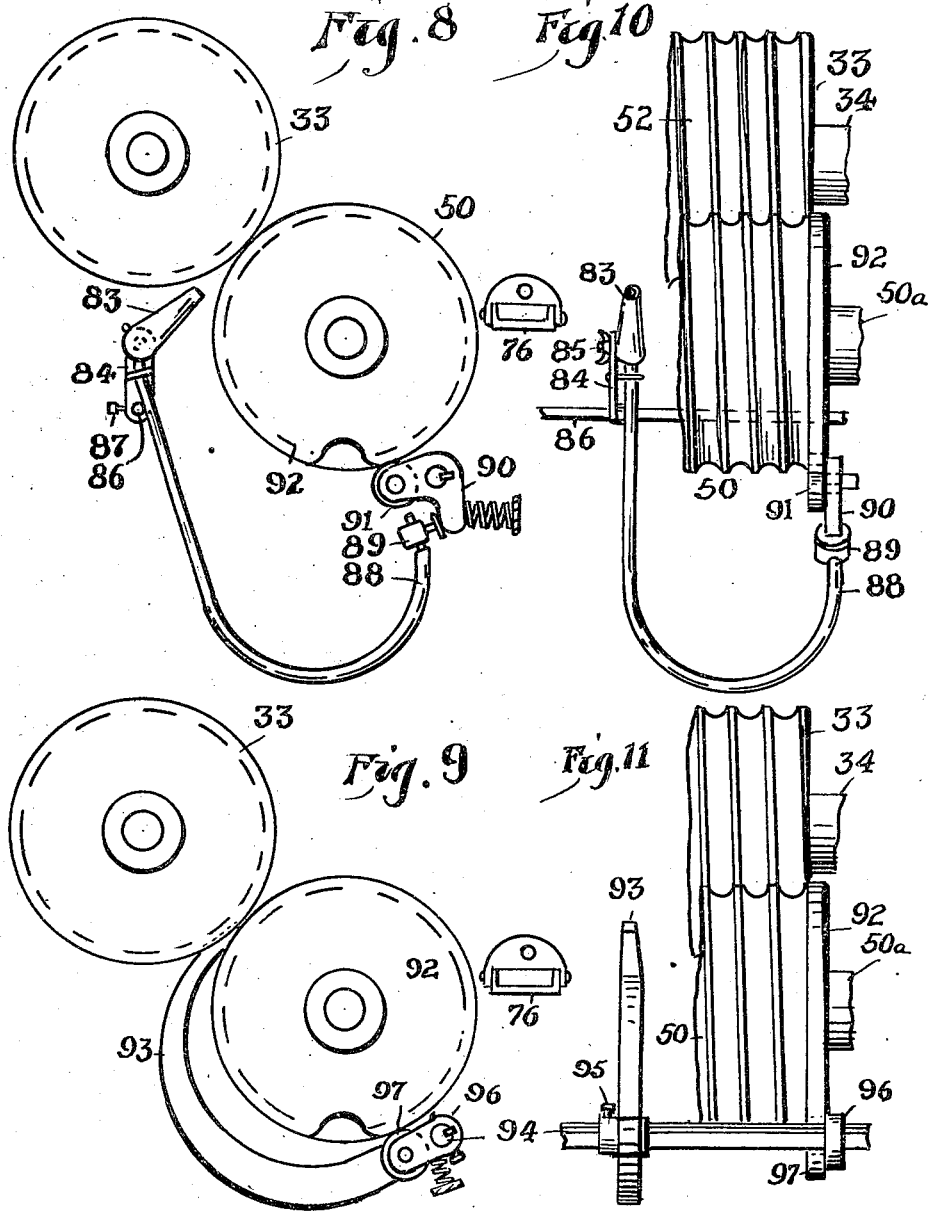

Sept. 28, 1926.
W. J. MILLER
1,601,699
MACHINE FOR MANUFACTURING MARBLES AND SIMILAR ARTICLES
Filed Dec. 12, 1924 5 Sheets-Sheet 5
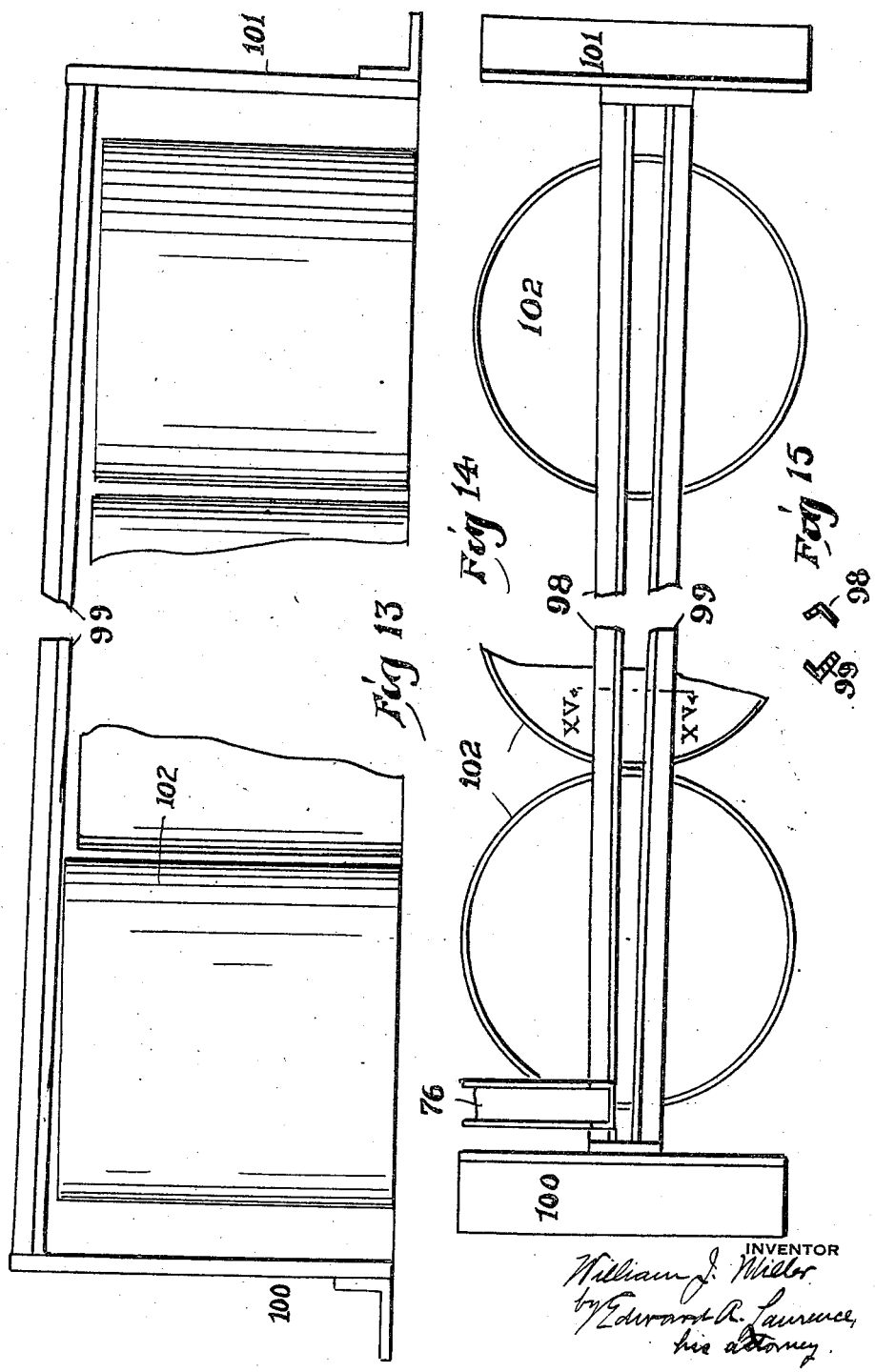

Patented Sept. 28, 1926.

1,601,699

UNITED STATES PATENT OFFICE.

WILLIAM J. MILLER, OF SWISSVALE, PENNSYLVANIA, ASSIGNOR TO VICTOR J. GREENE, OF PITTSBURGH, PENNSYLVANIA.

MACHINE FOR MANUFACTURING MARBLES AND SIMILAR ARTICLES.

Application filed December 12, 1924. Serial No. 755,499.

My invention relates to machines for manufacturing marbles or other spherical articles.

The objects of this invention are to provide a machine having spirally grooved sphere-forming rolls with means for making perfectly spherical bodies from glass or other plastic material; to provide means for turning over or initially rotating the gobs which are unspherical upon their contact with the rolls, but which come quickly into proper shape to be frictionally driven by the rolls after they have been preliminarily turned over a few times by "turn-over" devices which I have provided; to provide means for discharging, ejecting or "kicking out" the spheres at any predetermined point or points before they travel the entire length of the rolls, thereby removing the spheres after they have become sufficiently cooled and before they are liable to become broken by too long contact with the metal rolls, and thus adapting the machine to the production of wide ranges in sphere diameter; to provide adjustment of the rolls with respect to each other, and adjustment of both rolls with respect to the angularity of the roll-pass with a vertical plane; to provide a machine of the class described wherein both rolls may have the same diameter without loss of friction on the spheres sufficient to rotate them; to provide means whereby the gobs may be dropped directly into a forming groove in a roll; and to provide means whereby the axes of the rolls may be set at different angles to each other whereby the spheres will be progressively discharged in accordance with their diameters. Other objects appear hereinafter.

Referring to the accompanying drawings, which are however merely intended to illustrate a practical embodiment of the principles of my invention without limiting the scope to the construction shown, Fig. 1 is a rear elevation of a machine embodying my invention, parts being broken away; Fig. 2, an end elevation of the machine, looking at Fig. 1 from the left; Fig. 3, a cross-section of the forming cylinders, showing particularly a means for preliminarily rotating a gob of glass after it drops into the forming grooves of the said cylinders; Fig. 4, a side view of a fragment of the upper cylinder, showing a plan view of the said means; Fig. 5, a longitudinal section through a portion of the upper cylinder showing a "kick-off" for a finished marble; Fig. 6, a vertical section of a cooperating portion of the cylinders with a marble in process of manufacture; Fig. 7, an enlarged elevation of a portion of the machine, showing a portion of the forming rolls and those parts adjacent thereto, parts being broken away, the view being taken from a point at right angles to the plane including the axes of both rolls and centrally between them; Fig. 8 is a diagrammatic view showing a pneumatic kick-off means; Fig. 9 is a view similar to Fig. 8 showing a mechanical kick-off means; Fig. 10 is a broken elevation looking from the right of Fig. 8; Fig. 11 is a similar view looking from the right of Fig. 9; Fig. 12 is a broken plan view showing the feed funnel mounting; Fig. 13 is a broken side elevation of the sorting apparatus to which the product of the machine is delivered; Fig. 14 is a plan view of the same, and Fig. 15 is a sectional detail taken along the line XV—XV in Fig. 14.

The following is a detailed description of the drawings.

The frame or base of the machine is formed by two end members 1 and 2, connected together by the tie-rods 3 whose ends are clamped in split collars 3ª on the end members. The tie-rods may be adjusted in said collars so that the machine frame may accommodate longer or shorter rolls. To render the machine conveniently portable the end members may be mounted on the wheels 4.

5 represents a shaft journaled in bearings on the end members 1 and 2, one of said bearings being shown at 6 in Fig. 2. Loosely mounted on said shaft at either end are a pair of arms 7 and 8. As the arms 7 and 8 at each end of the machine are constructed and controlled in like manner, I will proceed to describe the said arms shown in Fig. 2.

The outer ends of said arms 7 and 8 are provided with swivel blocks 9 and 10, respectively, having stems 11 and 12 oscillatable in bearing openings in the arms. A screw shaft 13 is rotatable in both the blocks 9 and 10, said shaft being provided with a threaded lower end 14 which engages the threaded bore of the block 10. On either side of the block 9 said shaft is provided with fixed collars 10ª and 10ᵇ to prevent longitudinal travel of the shaft in the block 9.

15 is a hand wheel mounted on the upper end of the shaft 13.

16 is a collar loosely sleeved on the shaft 13 below the block 10, and 17 is a nut screwed on the lower end of the shaft 13 and which may be tightened against the collar 16 to lock the shaft in its adjusted position.

It is evident that by rotating the shaft 13 in the proper direction the arm 8 may be moved toward or away from the arm 7.

The triangular unit comprised of the arms 7 and 8 and the shaft 13 may be adjusted angularly on the shaft 5 and is supported in its adjusted position by the rod or shaft 18 whose upper end is swiveled to a block 19 having its stem 20 inserted in a bearing in the arm 7 below the block 9, while the lower end of said shaft 18 is threaded as at 21 and screwed in the threaded bore of the swivel block 22 whose stem 23 engages a bearing 24 on the top of the frame 1 and near its rear end. 25 is a sleeve on the shaft 18 bearing against the block 22, and 26 is a nut on said shaft adapted to be screwed against the end of the sleeve to lock the shaft stationary in any selected adjustment. The rod 18 is provided with a radial handle 27, and the nut 26 with a similar handle 28.

It is evident that by turning the shaft 18 in the proper direction, the arms 7 and 8 may be swung clockwise or counterclockwise on their axis.

To enable the two shafts 13 to be rotated in unison, I connect the same by a sprocket-chain 29 engaging the sprocket wheels 30 carried by the shafts 13 and fixable thereon, as by the set screws 30ª.

Thus in unison the two arms 7 may be caused to approach or retreat from the corresponding arms 8 by rotating one of the shafts 13. By first loosening the set screw of one of the sprockets, thus releasing the operative connection between the two shafts, one of the arms 8 may be adjusted to a different angle to its companion arm 7 than that of the other arm 8. The sprocket-wheel may then be refixed on its shaft, and thereafter the two arms 8 may be moved in unison for adjustment.

It is thus evident that the two rolls may be disposed in parallelism or with their axes in angular relation to each other. It is also evident that the rolls may be caused to approach or to separate to any predetermined degree without disturbing their parallelism or angular relation. It is further evident that the obliquity of plane of the axes of the two rolls to the horizontal may be adjusted without disturbing their relation to each other.

I will now proceed to describe the rolls and their operative connections.

A stationary shaft 31 is mounted in the arms 7, one end of the shaft, the right end in Fig. 1, being threaded in one arm 7 for longitudinal adjustment thereof, and is held in any selected adjustment by the nut 32 screwed on the threads and engaging the side of the adjacent arm 7. The cylinder or roll 33 is rotatably mounted on the shaft 31 and is provided at one end with the hub 34 rigid therewith and carrying the gear 35. Near the inner side of the arm 7 standing at the end of the machine opposite the end which has the gear 35, viz. the left end in Fig. 1, is the collar 36 secured to the shaft by the screws 37. A coiled spring 38 surrounds the shaft 31 between the collar 36 and the adjacent end of the cylinder 33, thus tending to force the roll toward the right in Fig. 1. Between the hub 34 and the adjacent arm 7 is the collar 39 secured to the shaft 31 by the screws 40. Between this collar and the sleeve 34 is an antifriction member loose on the shaft 31 and composed of two annular races 41 with a series of antifriction balls 42 between them. The collar 39 carries the set screws 43 which abut against the said antifriction collar, so that the latter collar, which has one edge against the end of the sleeve 34, may, by setting said screws, be adjusted to the desired degree of angularity with the shaft 31. The end of the sleeve 34 adjacent to the collar 41 has the pin 44 projecting toward the adjacent race 41 and engaging the adjacent face thereof. The spring 38 also performs the function of permitting the expansion of the roll without material binding, also automatically taking up wear and preventing looseness and excess longitudinal shifting.

Thus the roll 33 is given a repeated or continuous reciprocatory movement as it rotates, the spring 38 yielding to permit this movement and keeping the pin 44 constantly in contact with the antifriction collar, and the extent of such reciprocation may be regulated by the proper adjustment of the set screws 43 which determine the angle of the members 41.

The arms 7 have the longitudinal slots 45 opening into the seats for the shaft 31, and bolts 46 are passed through the arms and across the slots to cause the shaft to be securely clamped in its seats to prevent the shaft from rotating and to insure rigidity and proper alinement.

The arms 8 support the shaft 47 which is parallel with the shafts 5 and 31. Said arms have the slots 48 and the bolts 49 for clamping the shaft 47 rigidly in the arms 8 in the same manner that the slots 45 and the bolts 46 hold the shaft 31 fixedly in the arms 7. The shaft 47 has rotatably mounted thereon the cylinder or roll 50 whose hub 50ª carries the gear 51. The rolls 33 and 50 are shown of equal diameters, but they may have different diameters, if desired. The peripheries of the rolls are adjacent but preferably not in contact. Where spheres within a range of smaller sizes are to be manufactured, the rolls are set relatively close together, while for producing a range of larger sizes of spheres the rolls are set farther apart.

Each roll has a continuous helical groove, marked 52 on the roll 33, and 53 on the roll 50. These grooves are arc-shaped in cross-section, the arc covering preferably about one-third of a circle. At the "meeting" or working line of the rolls, the grooves in the rolls register approximately with each other, except that the grooves of the upper roll are preferably caused to reciprocate due to the action of the cam roller 41 on the roll 33, the extent of such reciprocation being regulable by the adjustment of the screws 43 as explained.

At the feed end of the rolls I provide means for depositing thereon the gobs or masses of the molten glass or other material from which the spheres are to be manufactured. Thus 54 is a collar fixed by screw 55 on the shaft 47 between the arm 8 and the end of the roll 50 at the left end of Fig. 1. 56 is an arm extending up from said collar and which has connected thereto, by the bolt 57 and slot 58, the vertical leg 59 of a bracket whose horizontal leg 60 forms a platform. 61 is a double sleeve bearing depending below said platform and 62 is a shaft journaled in said bearing and held against longitudinal movement therein by a collar 63 on said shaft between the sleeves of the double bearing, said collar being held in place by a set screw. On the outer end of the shaft 62 is fixed the feed funnel 64 whose lower or delivery end is above the roll 50.

The adjacent end of the roll 50 is provided with helical channel or groove 65 of the same angularity with the working groove 53 of said roll, but which is slightly less than a full turn, the ends of said channel 65 being connected by a quick-return channel 66. 67 is a roller engaging the channel 65—66, said roller being mounted on a stem 67ª depending from the front end of the arm 67ᵇ whose rear end is pivoted on a vertical axis from the under side of the platform 60 while its front or free end is connected by a link 68 to the funnel 64.

It is evident that as the roll 50 revolves with the roller 67 engaging the channel 65—66, the funnel is turned back on its axis, and the link 68 is of such length that the lower end of the funnel will be maintained in registry with the first turn of the groove 53, and at the completion of such turn will be shifted by a quick movement back to the beginning of the same, thus accurately directing the gobs or charges into the roll groove.

The gobs may be cut by hand or automatic shears. Thus I have shown mounted on the platform 60, above the funnel 64, the shears 69 automatically operated by the fluid-pressure mechanism 70. 71 indicates a shear-actuating lever conveniently placed to be operated by being struck by the punty in hand feeding. It is evident that an automatic feeder may be employed to supply the gobs or charges to the funnel 64.

The initial turns of the groove 52 of the roll 33 are preferably provided with gob-turning lugs 72 which preferably project slightly beyond the periphery of the roll and may have their forward or leading faces undercut so that they will hook into the gobs of glass during the initial process of forming spheres therefrom, and start the gobs rotating, one gob 73 being shown in Fig. 3 about to be turned by a lug 72.

Some of the turns of the groove 52 of the roll 33 may have a "kick-out", as shown as a screw 74 with an undercut head, the roll having at the bottom of the groove the holes 75 into which a kick-out screw may be inserted in any selected turn along the length of the roll. At the front of the roll 50 is the trough 76, inclined to the right on Fig. 1, and having one edge close to the roll, to receive such spheres as may be kicked out of the grooves 52 and 53. This trough has a flat bottom which is relatively wide so that, if some of the spheres block the trough, there will be room for other spheres to pass around the blocking ones.

At the end of the machine opposite to that provided with the funnel 64 a trough 77 is provided to receive any spheres which have been fed entirely through the spiral grooves.

I have shown the grooves 52 and 53 of the same size, but they may have different sizes or cross-sectional shapes, if desired.

78 is a shaft mounted to rotate on the frame members 1 and 2 below the shaft 5, and provided with the pinion 79 meshing with the spur-gear 80 on the shaft 5, the gear 80 meshing with the gears 35 and 51. The shaft 78 may be driven by any suitable source of power.

It is apparent the rolls 33 and 50 are carried on supports concentrically arranged relative to the shaft 5, so that adjustment of said rolls, either in unison or severally, will not disturb or impair the driving connections of the rolls.

In the operation of the machine, the glass or other plastic material may be fed by means of a punty, the gob or charge being sheared off by hand shears or the shear blades 69, the sheared-off gob being allowed to drop into the chute or funnel 64, whence it is delivered into the groove 53 of the roll 50. The shear blades 69 may be located below the delivery orifice of an automatic glass feeder such as are used in feeding glass in gobs to molds or other devices in the manufacture of tumblers and other glass articles.

The sheared-off gob drops into and is carried along the groove in the roll 50 to its forming position where it contacts with both rolls, a portion of the gob being in the groove of each roll. The lower roll 50 rotates on its upper side toward the gob and the upper roll 33 rotates on its front side up away from the gob. The rolls rotating in the same direction tend to rotate the gob. However, the gob is usually at first distorted and is not readily, if at all rotated by mere friction with the rolls. The "turn-over" lugs 72 are provided to engage the gob and assist it to rotate. After the gob becomes more or less spherical and has acquired momentum, the rolls themselves rotate the sphere by friction and without other aid.

The sphere is pushed laterally as well as rotated, whereby there is a tendency of the glass to become prolate or elongated in one direction. The glass has its principal contact at one point in each roll which tends to elongate it. By slightly reciprocating at least one of the rolls, such as the roll 33, as hereinbefore described, the glass will pass from one direction of inclination, as shown in Fig. 6, to different positions as the roll 33 is reciprocated from point to point, whereby the tendency of the glass to prolate distortion is corrected and a truly spherical shape is obtained. In the case of small gobs the tendency to prolate is accentuated.

In order to remove the glass spheres before they get too cold and break, a kick-out lug 74 properly positioned in one of the holes 75 strikes it from below and causes it to pass over the roll 50 whence it goes into the trough 76. With any adjustment of the rolls with each other or with the vertical, differently sized spheres can be made, provided they are not so small as to fall between the rolls or not too large for the grooves in the rolls, the size depending on the size of the gobs fed to the rolls. Smaller gobs would be formed into spheres and cool sooner than larger gobs would be. So the kick-off is positioned so that when making smaller spheres or when employing plastic material which hardens or solidifies rapidly, the sphere is ejected before it reaches the end of the roll and when proper solidification has been imparted and before breakage is probable.

When large size marbles are to be made, the rolls are spaced relatively far apart, so that the two grooves are substantially concentrical. In this relation spheres or marbles down to a size small enough to drop between the rolls may be formed. When smaller spheres are to be made the rolls are adjusted closer to each other. The maximum size which any given adjustment will produce is determined by the capacity of the combined grooves, while the minimum is the smallest diameter of sphere which will not drop between the rolls.

By causing the rolls to diverge from their feed end, the marbles or other spheres may be automatically discharged by dropping down between the rolls, the smallest spheres being first discharged and other sizes progressively as the clearance between the rolls affords opportunity. Thus the machine will automatically sort its product in accordance with the diameter of the spheres.

If the axes of the two rolls 33 and 50, which preferably rotate at the same peripheral speed were disposed in the same horizontal plane, the gobs or gathers of glass would tend to drop down vertically between the rolls instead of following the working line of the rolls. However the disposal of the roll axes in a plane angular to the horizontal causes the lower roll to have a supporting or "tabling" action which prevents such a premature discharge of the glass from the machine. By adjusting the angularity of the plane of the axes such supporting or tabling action may be regulated.

Any adjustment of the roll 50, either alone or with the roll 33, changes the position of the roll 50 with respect to the funnel 64, the shear blades 69 and the trough 76. The funnel and the shear blades can be restored to their normal relative positions with respect to the roll 50 by loosening the set bolt 55 and adjusting the collar 54 properly on the shaft 47 and then tightening the bolt 55; and by loosening the bolt 57 and setting the bracket member 59 at the proper position and then tightening the bolt 57.

The trough 76 is supported on the arm 81 by the pivot bolt 82, so that the bolt may be loosened and the trough swung thereon to compensate for any change of position of the roll 50.

In Figs. 8 and 10 I show a pneumatic kick-out device which is adjustable along the machine to discharge the spheres at any desired point.

Thus 83 is an air-blast nozzle directed from the rear of the machine toward the meeting line of the rolls. Said nozzle is carried by a bracket 84 upon which it is pivotally mounted by means of a clamping bolt 85 to admit of angular adjustment of the nozzle. The bracket is slidably mounted on a supporting rod 86 extending horizontally between the two end members of the machine frame, and is fixable on said rod in any adjusted position, as by the set screw 87. 88 is a compressed air hose for supplying fluid-pressure to said nozzle, said hose being provided with a spring closed valve 89 against which bears one arm of a bellcrank lever 90. The other arm of said lever carries a roller 91 which engages the perimeter of a notched cam disk 92 coaxial with the roll 50 and rotating therewith. The roller is resiliently held in contact with the disk. When the roller engages the notch of the disk, the valve is momentarily opened and the air-blast from the nozzle discharges the sphere in front of it. The air-blast should be timed with the feed so as to operate as a sphere comes in front of the nozzle.

In Figs. 9 and 11 I show the use for the same purpose of a kick-out finger 93 slidably mounted on the horizontal rod 94 and fixable at any adjusted position along said rod by the set screw 95. One end of said rod 94 is provided with a radial arm 96 having a roller 97 engaging the perimeter of the notched cam disk 92. It is evident that periodically the free end of the finger will be projected between the rolls to discharge the spheres.

As a convenient means for sorting the spheres, produced by the machine, in accordance to their diameters, I provide a sorting apparatus shown in Figs. 13, 14 and 15. Said apparatus comprises a pair of angle irons 98 and 99 supported at their ends by the stands 100 and 101 and in substantially the relation shown, the irons being slightly higher at one end and gradually diverging toward their other end. The trough 76 is positioned to empty its contents into the space or channel formed between the irons 98 and 99 at their high end and the spheres will run down the incline, dropping down between the angle irons at different distances according to their diameters. Beneath the angle irons cans 102 are arranged to catch the dropping spheres which are thus automatically sorted and deposited in the proper containers.

What I claim is:—

1. In a machine for forming spherical bodies, the combination of a pair of rolls provided with helical peripheral grooves, the axes of the rolls being disposed in a plane oblique to the horizontal, and means for rotating the rolls, the upper roll moving upwardly at the working line of the rolls.

2. In a machine for forming spherical bodies, the combination of a pair of rolls provided with helical peripheral grooves, the axes of the rolls being disposed in a plane oblique to the horizontal, and means for rotating the rolls in the same direction, the upper roll moving upwardly at the working line of the rolls.

3. In a machine for forming spherical bodies, the combination of a pair of rolls provided with helical peripheral grooves, the axes of the rolls being disposed in a plane oblique to the horizontal, means for rotating said rolls, and means for adjusting the obliquity of the plane of said axes.

4. In a machine for forming spherical bodies, the combination of a pair of rolls provided with helical peripheral grooves, the axes of the rolls lying in a plane oblique to the horizontal, means for rotating said rolls, and means for varying the obliquity of said plane by arcuate movement of the rolls relative to a common axis.

5. In a machine for forming spherical bodies, the combination of a pair of rolls provided with helical peripheral grooves, the axes of the rolls lying in a plane oblique to the horizontal, means for rotating said rolls, and means for adjusting the rolls in the plane of their axes.

6. In a machine for forming spherical bodies, the combination of a pair of rolls provided with helical peripheral grooves, the axes of the rolls lying in a plane oblique to the horizontal, means for rotating the rolls, and connections for adjusting the rolls in the plane of their axes without changing the relative angular relation of the rolls.

7. In a machine for forming spherical bodies, the combination of a pair of rolls provided with helical peripheral grooves, and mountings for said rolls adjustable about a common axis whereby the distance between the rolls at the working line may be varied.

8. In a machine for forming spherical bodies, the combination of a pair of rolls provided with helical peripheral grooves, mountings for said rolls adjustable about a common axis whereby the distance between the rolls at the working line may be varied, and means for adjusting said rolls in unison relative to said axis.

9. In a machine for forming spherical bodies, the combination of a pair of rolls provided with helical peripheral grooves, mountings for said rolls adjustable about a common axis whereby the distance between the rolls at the working line may be varied, and means for adjusting said rolls individually relative to said common axis.

10. In a machine for forming spherical bodies, the combination of a pair of rolls provided with helical peripheral grooves, driving means for rotating said rolls, and means for adjusting the position of said rolls by moving their axes in an arcuate path concentric with said driving means.

11. In a machine for forming spherical bodies, the combination of a pair of rolls provided with helical peripheral grooves, the axes of said rolls lying in a plane to the horizontal, means for varying the obliquity of said plane, driving means for rotating said rolls, and means whereby the obliquity of the plane of the axes of said rolls may be varied without disturbing said driving means.

12. In a machine for forming spherical bodies, the combination of a pair of rolls provided with helical peripheral grooves, driving means for rotating said rolls, and means for adjusting the position of said rolls with respect to each other by an arcuate movement relative to a common axis.

13. In a machine for forming spherical bodies, the combination of a pair of rolls provided with helical peripheral grooves, driving means for rotating said rolls, and means for adjusting the relative position of the rolls with respect to each other by arcuate movement.

14. In a machine for forming spherical bodies, the combination of a pair of rolls provided with helical peripheral grooves. driving means for rotating said rolls, and means for providing relative oscillatory movement between said rolls during the passage of an article through the machine.

15. In a machine for forming spherical bodies, the combination of a pair of rolls provided with helical peripheral grooves, driving means for rotating said rolls, means for providing relative longitudinal movement between said rolls, and means for regulating the extent of said repeated reciprocating movement.

16. In a machine for forming spherical bodies, a pair of rolls provided with helical peripheral grooves, driving means for rotating said rolls, and means for repeatedly reciprocating one of the rolls during the passage of an article through the machine to remove the tendency of the rolls to make the said bodies prolate.

17. In a machine for forming spherical bodies, a pair of rolls provided with helical peripheral grooves, means for rotating said rolls, a fixed shaft for supporting one of the rolls, a spring tending to push the last named roll longitudinally on the shaft, a stationary cam arranged obliquely to the shaft, and a pin movable with the latter roll and engaging the cam to cause the said roll to move longitudinally against the pressure of the spring.

18. In a machine for forming spherical bodies, the combination of a pair of rolls provided with helical peripheral grooves, means for rotating said rolls, and connections whereby the angular relation between the axes of the rolls may be varied while the driving connections subsist.

19. In a machine for forming spherical bodies, the combination of a pair of rolls provided with helical peripheral grooves, the axes of the rolls lying in a plane oblique to the horizontal, means for rotating said rolls, and connections whereby the angular relation between the axes of the rolls may. be varied while the driving connections subsist.

20. In a machine for forming spherical bodies, the combination of a pair of rolls provided with helical peripheral grooves, the axes of said rolls lying in a plane oblique to the horizontal, means for varying the obliquity of said plane, and means for adjusting the relative angularity of the axes of said rolls.

21. In a machine for forming spherical bodies, the combination of a pair of rolls provided with helical peripheral grooves, masses of the material to be formed being fed to said grooves at one end of said rolls, means for rotating said rolls, and means in addition to the friction of rotation for imparting an initial rotary movement of said masses after their deposit in the grooves.

22. In a machine for forming spherical bodies, the combination of a pair of rolls provided with helical peripheral grooves, masses of the material to be formed being fed to said grooves at one end of said rolls, means for rotating said rolls and means in addition to the friction of rotation starting said masses to rotate as they are deposited in said grooves.

23. In a machine for making spherical bodies, a pair of rolls having helical peripheral grooves, means for rotating the rolls, and means carried by the roll which tends to roll the said bodies out of their position, for initially engaging a mass of material received in working position between the rolls and rotating the same.

24. In a machine for forming spherical bodies, the combination of a pair of rolls provided with helical peripheral grooves, said grooves being oppositely disposed and the rolls being rotated in the same direction, and means adapted to eject the spherical bodies from said grooves before said bodies have reached the ends of the helical grooves.

25. In a machine for forming spherical bodies, a pair of rolls having spiral oppositely arranged peripheral grooves, the axes of the rolls lying in a plane oblique to the horizontal, means for rotating the rolls in the same direction, and means carried by the roll which tends to roll the said bodies out of the forming position for engaging the bodies and freeing them from the rolls.

26. In a machine for forming spherical bodies, a pair of rolls having spiral oppositely arranged peripheral grooves, the axes of the rolls lying in a plane oblique to the horizontal, and means disposed at one of a plurality of points arranged longitudinally along one roll for ejecting the said bodies from the rolls.

27. In a machine for forming spherical bodies, the combination of a pair of rolls provided with helical peripheral grooves, a guide for directing masses of the material to be formed into feeding relation with said rolls, and means for shifting said guide to maintain it in substantial registration with the initial turn of the groove of the receiving roll.

28. In a machine for forming spherical bodies, the combination of a pair of rolls provided with oppositely arranged helical peripheral grooves, the axes of the rolls lying in a plane oblique to the horizontal, means for rotating said rolls, and a guide for directing masses of the material to be formed into the initial turn of the groove of the lower roll, and means for shifting said guide to maintain it in substantial registration with said turn.

29. In a machine for forming spherical bodies, the combination of a pair of rolls provided with helical peripheral grooves, means for ejecting laterally the spherical bodies from the rolls, and a chute disposed along one of said rolls and in substantial parallelism therewith to receive the ejected bodies.

30. In a machine for forming spherical bodies, the combination of a pair of rolls provided with helical peripheral grooves, the axes of said rolls lying in a plane oblique to the horizontal, a trough disposed along the lower roll to receive spherical bodies ejected from the machine, and means for ejecting said spherical bodies.

31. In a machine for forming spherical bodies, the combination of a pair of rolls provided with helical peripheral grooves, the axes of said rolls lying in a plane oblique to the horizontal, a trough disposed along the lower roll to receive spherical bodies ejected from the machine, and means for ejecting the spherical bodies from the machine at a predetermined point.

32. In a machine for forming spherical bodies, the combination of a pair of rolls provided with helical peripheral grooves, the axes of said rolls lying in a plane oblique to the horizontal, a trough disposed along the lower roll to receive spherical bodies ejected from the machine and means adapted to be positioned at various points along the rolls to eject the spherical bodies from the machine.

33. In a machine for forming spherical bodies, the combination of a pair of rolls provided with helical peripheral grooves, the axes of said rolls lying in a plane oblique to the horizontal, a trough disposed along the lower roll to receive spherical bodies ejected from the machine, means for varying the obliquity of said plane, means for adjusting the position of the trough to suit the altered position of the rolls, and means for ejecting the sperical bodies from the machine.

34. In a machine for forming spherical bodies, the combination of a pair of rolls provided with helical peripheral grooves, the axes of said rolls lying in a plane oblique to the horizontal, a trough disposed along the lower roll to receive spherical bodies ejected from the machine, means for varying the obliquity of said plane, means for adjusting the position of the trough to suit the altered position of the rolls, and means for ejecting the spherical bodies from the machine, said ejecting means being adjustable to operate at different points on the rolls.

35. In a machine for forming spherical bodies, a pair of rolls having helical peripheral grooves, the axes of the rolls lying in a plane oblique to the horizontal, means for varying the obliquity of said plane, a flat bottomed chute lying longitudinally of the lower roll and close to the side thereof, and means for adjusting the chute to compensate for the adjustment of the lower roll and maintain the cross-section of the said bottom substantially horizontal.

36. In a machine for making spherical bodies, a pair of rolls provided with helical oppositely arranged peripheral grooves, the axes of the rolls lying in a plane oblique to the horizontal, a guide for directing gobs of molten glass into a definite position on one of the rolls, means for adjusting that roll laterally, and means for adjusting the guide to restore it to its original position relative to the said roll.

37. In a machine for forming spherical bodies, the combination of a pair of coacting rolls each provided with a helical peripheral groove, and means whereby the relationship between said rolls may be adjusted so that their axes diverge from the feed end of the rolls, whereby the spherical objects will be progressively discharged in accordance with their diameters by dropping down between the rolls.

38. In a machine for forming spherical bodies, the combination of a pair of coacting cylindrical rolls each provided with a helical peripheral groove, and means whereby the relationship between said rolls may be adjusted so that their axes diverge from the feed end of the rolls, whereby the spherical objects will be progressively discharged in accordance with their diameters by dropping down between the rolls.

39. In a machine for forming spherical bodies, the combination of a pair of coacting rolls each provided with a helical peripheral groove, the material from which the articles are to be formed being fed to the working line of the rolls at the initial turn of the grooves in masses of the proper size and said masses traveling along the working line of the rolls, and means for causing a repeated reciprocating movement between the rolls during the travel of a mass.

40. In a machine for forming spherical bodies, the combination of a pair of coacting rolls, each provided with a helical peripheral groove, the material from which the articles are to be formed being fed to the working line of the rolls at the initial turn of the grooves in masses of proper size and said masses traveling along the working line of the rolls, means for causing a repeated reciprocating movement between the rolls during the travel of a mass, and means for adjusting such reciprocating movement.

Signed at Swissvale, Pa., this 20th day of November, 1924.

WILLIAM J. MILLER.